Patented Sept. 9, 1952

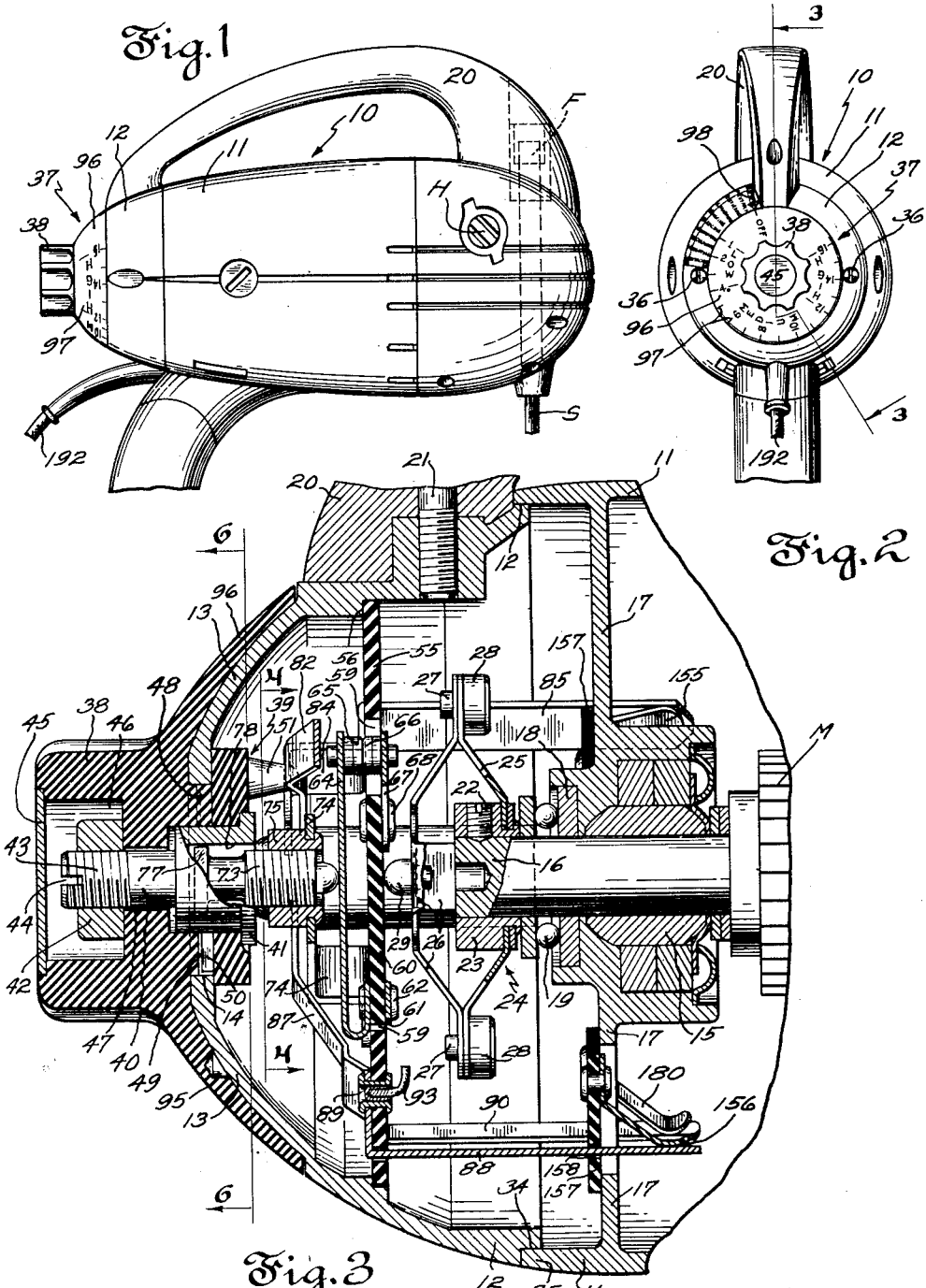

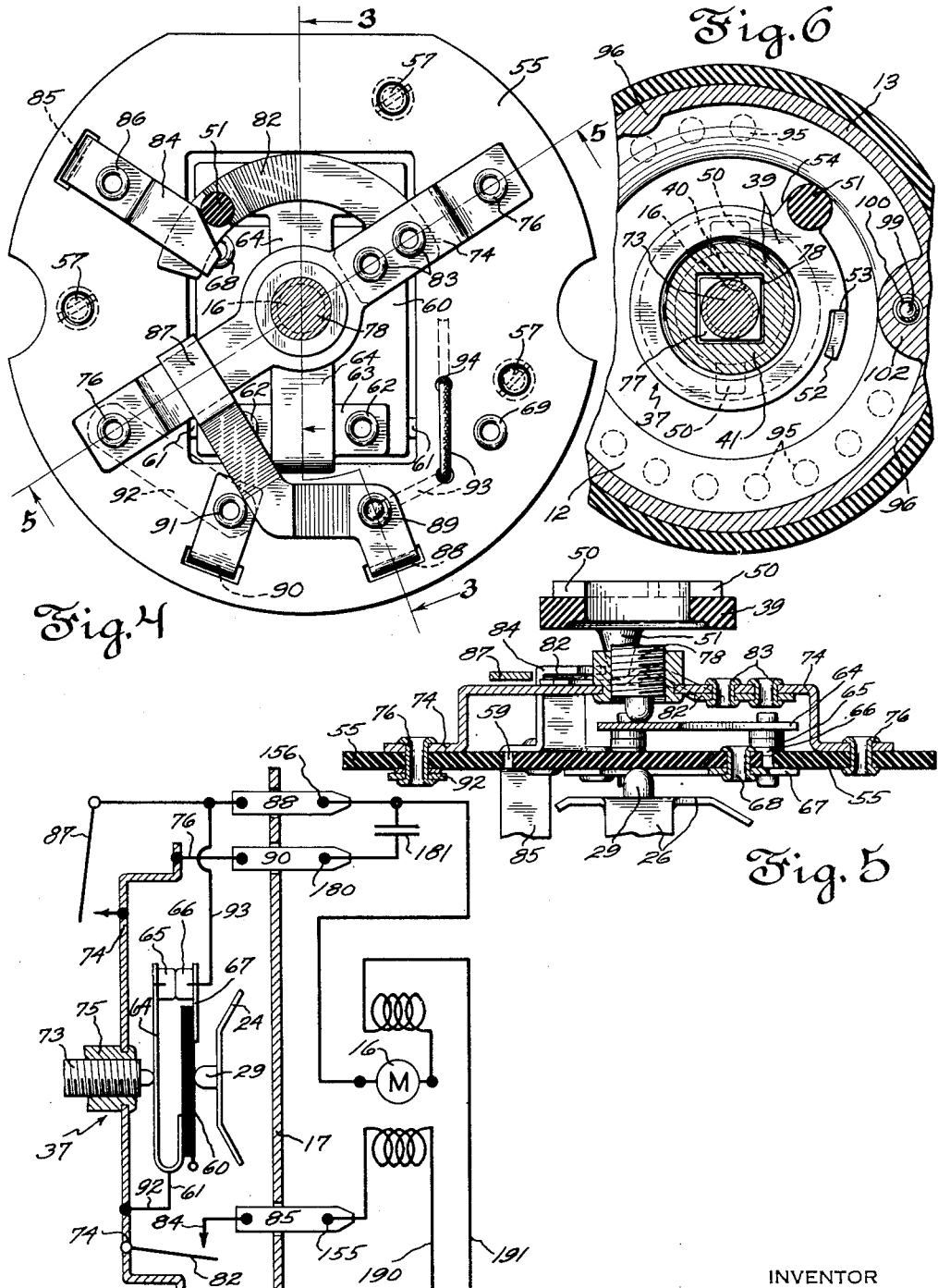

2,610,314

UNITED STATES PATENT OFFICE 2,610,314

MOTOR SPEED AND CIRCUIT GOVERNING ELECTRICAL SYSTEM

Shirley P. Morse, East Haven, Conn., assignor to The A. C. Gilbert Company, New Haven, Conn., a corporation of Maryland Original application November 8, 1945, Serial No. 627,479. Divided and this application March 18, 1948, Serial No. 15,616

4 Claims. (Cl. 318—268)

This invention relates to electric control systems involving centrifugally responsive manually settable circuit controllers for starting, stopping, maintaining and/or regulating the speed of running of an electric motor. This application is divisional from my copending application, Serial No. 627,479, filed November 8, 1945, now Patent No. 2,056,312, May 2, 1950.

An important object of the present improvements is, when desired, to relieve motor speed regulating contacts of the duty of carrying heavy electrical loads for prolonged periods of time when automatic regulation of the motor speed is not required.

A contributory object is to enable a single handled, speed-setting, electric controller to stop the motor, to direct current to the motor through automatically operative speed regulating contacts by which the running speed of the motor is automatically determined and maintained, and optionally to direct current to the motor around or independently of such speed regulating contacts.

A further object is to relieve the speed regulating contacts of heavy current carrying duty by short circuiting them upon occasions, such as when the motor is utilized to drive food processing accessories for extracting fruit juices, grinding meat, cracking ice, seeding raisins, etc.

These and related objects of the improvements will appear in greater particular in the following description of a successful embodiment of the invention which has reference to the appended drawings. In the drawings arrows applied to section planes indicate the direction in which the subject is viewed in those figures of the drawings whose numbers correspond to the numerals applied to the arrows.

Fig. 1 is a side view of an electrically powered kitchen food mixing appliance in which is incorporated a manually settable motor circuit governing mechanism embodying the present improvements.

Fig 2 is a view looking from the left in Fig. 1 at the rear end of the appliance showing the motor speed setting handle and speed indicating indicia.

Fig. 3 is a view drawn on an enlarged scale taken in section through the motor speed governing mechanism on the planes 3—3 in Figs. 2 and 4.

Fig. 4 shows the rear face of the subassemblage of circuit making and breaking contacts removed from the speed setting unit and viewed from the plane 4—4 in Fig. 3.

Fig. 5 is a view taken in section on the plane 5—5 in Fig. 4.

Fig. 6 is a fragmentary view taken in section on the plane 6—6 in Fig. 3 showing swivel limiting stops for the speed setting handle.

Fig. 7 is a schematic diagram of electric circuits and wiring connections embodying one form of improved electrical systems made possible by the structures illustrated in the remaining figures of the drawings.

The motor circuit governor of these improvements is particularly adapted for installation in the rear end of a household food mixing appliance such as that shown in Fig. 1 whose motor and external instrumentalities are more completely shown in United States Patent No. 2,292,566, granted August 11, 1942. The torpedo shaped casing or housing structure of the appliance is indicated as a whole at 10 and for purposes of the present invention is divided into a main, motor surrounding section 11 and a rounded end section 12. As in Figs. 7, 8 and 9 of the aforesaid patent, the main casing section 11 may support the spindle or spindles S of conventional food agitators not shown, as well as a lateral power socket H or a top power socket F into which can be inserted the tenoned shaft of a food processing accessory such as a fruit juicer, meat grinder, ice cracker, raisin seeder or the like. This main casing section 11 also contains power transmission and chuck devices that couple the motor drivingly to such a spindle, spindles or accessory shafts as are fully set forth in the said patent.

In the main housing section a rotor bearing 15 for a motor armature and its shaft 16 is lodged in a housing partition wall 17, as is also a thrust washer 18 for the axial thrust ball bearing 19. There is fastened on the end of shaft 16 by set screw 22 the hub 23 of a centrifugal speed regulator indicated as a whole by 24. This automatic regulator as indicated in Fig. 3 may be of conventional construction and comprises two oppositely bowed spiders 25 and 26 each having four limber resilient radial arms, alike, joined together at their outer ends by fastenings 27 which also secure to said arms the centrifugal weights 28. The spider 25 nearest the motor is fixed on hub 23. The other of outer spider 26 carries coaxially with shaft 16 a pressor button 29 which moves toward the right in Fig. 3 as increasing rotary speed of the motor shaft and regulator brings centrifugal forces to play upon the weights 28.

The rounded end section 12 of the appliance housing structure is provided with a circumferential rabbet 34 which fittingly engages an annular terminal lip 35 on the main housing section 11 and is removably held in place fixedly by one or more screws such as 36. If desired the appliance handle 20 may also be fastened to section 12 by a bolt 21. Thus end section 12 together with its entire carried speed governing switch mechanism is integrated in the form of a unit detachable from the main housing section 11 and from handle 20.

Referring to Figs. 1, 2 and 3, the single manual speed setting controller, designated 37 as a whole, is shown to comprise a handle knob 38 outside the end housing section 12 and an actuator 39 inside of this housing section including a crank post 51 and a wrench-like socket 78. Actuator 39 is operably joined to handle 38 by a tie bolt 40 which may contain the socket 78 and whose head flange 41 draws the actuator 39 tightly against a hub 48 portion of handle 38 when nut 42 is tightened. Nut 42 is on the threaded end 43 of tie bolt 40 which has a screw driver slot 44 and is concealed in a central recess 46 in handle 38 covered by a removable snap plate 45 which can be forced into and pried out of a shallow counterbore around this recess. Tie bolt 40 extends with freely sliding clearance through a hole 47 in handle 38.

Hub 48 of handle 38 is thus journaled to turn freely in a central bearing hole 14 through the dome shaped wall 13 of end section 12 and is retained axially in place by the actuator 39 which is of large enough compass to overlap the inside of wall 13. Handle hub 48 is grooved diametrically at 49 and fittingly receives at least one key lug 50 fixedly carried by actuator 39 so that the actuator always turns in unison with handle 38. The extent of rotary movement of controller 37 is limited to less than a complete turn by a stationary stop abutment 52 projecting from the inner surface of wall 13 which encounters the turn limiting shoulders 53 and 54 on actuator 39. Crank post 51, and if desired other portions of actuator 39, will preferably be made of insulating material.

A group of current conductive parts, including broadside wavable flaps carrying circuit making and breaking terminals or contacts that are movable jointly by the centrifugal regulator 24 and by the speed setting manual controller 37, are disposed between and transverse the axis of such regulator and controller. These parts are all carried as a unit on a switch base plate 55 which is preferably of insulating material. Base plate 55 is removably fastened against an annular shoulder 56 formed internally on the removable end housing section 12 by screws 57 which engage with threaded holes in bosses 58 cast integrally with the wall of this housing section. A rectangular aperture 59 is cut in base plate 55 and is largely occupied by a stiff card flap 60 of insulating material swingably supported at one of its edges by a narrow thin twistable hinge strip 61 fastened to card 60 by eyelets 62. These eyelets are electrically conductive and also serve to clamp against the reverse face of card 60 the mounting flange 63 of a limber resilient U-shaped conductive flap 64 carrying at its opposite or free widened end two speed maintaining or regulating circuit terminal contacts 65 alike in polarity. Opposed respectively to contacts 65 are two cooperative speed maintaining or regulating contacts 66 alike in polarity but of different polarity from that of contacts 65. Contacts 66 are carried by a rigid conductive bridge strip 67 firmly fixed to card 60 by eyelets 68. The resilient flap 64 is normally so sprung as to tend to separate contacts 65 from contacts 66, but hinge strip 61 serves merely as a current conductor and simple form of pivotal anchorage for the card flap 60, exerting preferably little or no bias on the latter in either direction of the latter's useful small range of swinging movement. Eyelets 69 fix 61 to 55.

According to the parent application the switch base plate 45 also carries bearing support for a speed setting adjuster 73, such support being stationed on the end section 12 of the housing structure independently of and apart from the controller 37. The speed setting adjuster 73 is thus located between motor shaft 16 and the said manual controller in axial alignment with both of them. Specifically in the form herein illustrated, the bearing support includes a stiff bracket 74 of conductive material in which is fixed in coaxial relation to the motor shaft an internally threaded bushing 75. Bracket 74 is fastened to the switch base plate 55 by eyelets 76. The aforementioned adjuster 73 takes the form of a screw adjustably turnable in threaded engagement with bushing 75 and having a flat sided head 77 slidably fitting a flat sided socket 78 formed in the end of actuator 39. Thus adjuster 73 is operably related to the controller 37 while the latter remains freely separable from the former for permitting all of the parts carried by switch base 55 to be removed from the housing section 12 without disturbing the assemblage of controller 37 with this housing section.

We now come to the improved arrangement of motor cut-out and starting master contacts 82—84 together with auxiliary motor power sustaining contacts 87—74 for short-circuiting automatic speed regulating contacts 65 and 66, carried by base plate 55 in position to be actuated by the crank post 51 of the actuator 39 of the manual controller 37. The motor cut-out and starting pair of master contacts comprise a spring leaf conductor arm 82 serving as one contact of the master pair having one end fixedly anchored at its base end on bracket 74 by means of eyelets 83 and adapted at its free end to make and break contact with the overhanging shelf-like end of a stiff bent strip terminal 84 serving as the other contact of the master pair which is fixedly stationed on the base plate 55 by a through eyelet 86 and is elongated to extend through a closely fitting slot in the base plate and projects from the opposite face thereof to serve as a connector prong 85. The pair of auxiliary contacts for permanently sustaining the motor circuit by short-circuiting contacts 65 and 66 include spring leaf conductive arm 87, serving as one contact of the auxiliary pair, the free end of which overlies and makes and breaks contact with bracket 74 serving as the other contact of the auxiliary pair. Another elongated connector prong 88 together with arm 87 are conductively joined and fixed on base plate 55 by a through eyelet 89, said prong 88 extending through a closely fitting slot in base plate 55 and parallel with prong 85.

There is a third connector prong 90 similarly fixed on the base plate 55 by an eyelet 91 and extending through a closely fitting plate slot. Eyelet 91 also clamps a conductive bus strap 92 against the mounted end of prong 90 which carries current to the aforementioned hinge strip 61 of the card flap 60. It has heretofore been mentioned that hinge strip 61 is in permanent electrical connection with the conductive contact carrying flap 64 through eyelets 62.

A flexible lead wire 93 electrically connects the conductive bridge strip 67 on card flap 60 with eyelet 89 that fastens prong 88 to base plate 55 and without appreciably impeding free swinging movement of the card flap. The lead wire 93 passes from one face of base plate 55 to the other through holes 94 which enable wire 93 to cross the hinge strip 61 at a point where it is mechanically and electrically separated therefrom.

Fig. 6 shows a circular series of sunken spots 95 on the inner concave face of handle skirt 96 whose outer convex face is marked with speed indicating indicia 97 turnable into selective register with the index arrow 98 carried on the stationary wall 13 of housing section 12. A detent ball 99 is pressed by spring 100 into the circular path traversed by sunken spots 95 as the knob handle 38 is turned and serves yieldably to retain the handle in any of its several set rotary speed selecting positions. Spring 100 is free to expand axially in a bore 101 in boss 102 formed on the interior of housing section 12. The rear end of bore 101 faces the switch base plate 55 so that the latter retains the spring 100 in this bore and serves as removable thrust abutment for the spring.

In applying and removing the speed governing unit from the main body of the appliance, the free ends of the before described conductive prongs 85 and 88 wipe into or out of conductive engagement with spring clip circuit terminals 155 and 156, respectively, which connect electrically to the two sides of the motor. The third prong 90 in like manner wipes into and out of conductive engagement with a third spring clip circuit terminal 180 which connects electrically with a condenser 181 arranged in shunt relation to speed regulating contacts 65 and 66 for reducing sparking thereat. As indicated in Figs. 3 and 5 each of the three spring clip circuit terminals 155, 156 and 180 is mounted on an insulative supporting plate 157 that may be fixed on the partition wall 17 of the main section of the appliance housing. The plates 157 as well as wall 17 have registering apertures 158 to admit the prongs 85, 88 and 90 as the latter are thrust forward in joining the control unit to the main body of the appliance.

With particular reference to Fig. 7, in conjunction with other figures of the drawings, the operation will be described by starting with the speed setting handle 38 positioned as a Fig. 2 where the indicium "Off" registers with index arrow 98. At this time the shoulder 53 of the actuator 39 is at rest against the stationary stop lug 52 on the housing which permits only clockwise turning of the handle from its position in Fig. 2. Also in this "Off" position the crank post 51 bears against spring leaf arm or master contact 82 and holds the latter's free end separated from bent strip terminal or master contact 84, arm 82 being so sprung as normally to tend to contact with terminal 84.

While there are many possible circuit arrangements that will cause making and breaking of contact between 82 and 84 to start and stop the motor, Fig. 7 diagrams an electrical system in which current is fed to an appliance through two wires 190, 191 of a flexible attachment cord 192 shown in Fig. 1. Wire 190 leads to one field winding of the motor whose opposite end connects to a spring clip 155. The other wire 191 leads to the other field winding of the motor and thence through the motor brushes and armature M to the spring clip 156 and also to the condenser 181 whose other side is connected to spring clip 180. Thus it will be seen that in the above described starting position of the parts all current path from wire 190 is dead-ended at 84.

When handle 38 is turned clockwise in Fig. 2, crank post 51 swings clear of the spring leaf arm 82 permitting the latter to engage conductively the bent strip 84 which will complete a circuit through 190—motor field winding—155—85—84—82—74—92—61—64—65—66—67—93—88—156—motor field winding—191. Current can not at this time pass through prong 90 because circuit through the latter is dead-ended at condenser 181. The motor will now start and speed up until centrifugal force acting on regulator 26 draws the presser button 29 toward the right. Follow-up of card flap 60 is occasioned by the spring tension in flap 64 which always tends to separate speed regulating contacts 55, 56 and finally is able to do so when the motor has attained the speed for which the adjuster 73 has been set by handle 38. Upon this automatic separation of contacts 55, 56, the above said circuit through the motor will become broken and as the motor loses speed presser button 29 will move toward the left and ultimately re-make the motor circuit through contacts 65, 66. Thus alternate deenergizing and reenergizing of the motor will keep it at a constant set speed irrespective of variations in the mechanical load which it is called upon to drive. As the adjuster 73 is screwed toward the right in Figs. 3 and 7 by clockwise turning of handle 38 in Fig. 2, a higher and higher speed of the motor will be required to draw presser button 29 far enough to the right to separate contact 66 from contact 65 as is well understood in this art.

The present circuit governing mechanism incorporates a new and valuable feature in the ability to relieve the automatic speed regulating contacts 65, 66 of carrying the heavier current drawn by the motor when it is loaded with relatively heavy duty accessory appliances such as fruit juicers, meat choppers, etc. This is accomplished by providing an additional circuit from the prong 88 through the spring leaf conductive arm or auxiliary contact 87 to the point on bracket or auxiliary contact 74 touched thereby. This circuit is made when arm 87 is thrust into conductive contact with bracket 74 in the extreme rotary position of crank post 51 occasioned by turning handle 38 clockwise as far as it will go in Fig. 2. On this occasion limit shoulder 54 on actuator 39 brings up against the stop 52 and in this position, crank post 51 rides onto the sloping free end portion of spring arm 87 forcing the latter conductively against bracket 74. This short circuits the regular contacts 55, 56 so that these contacts are relieved of carrying heavy load currents for long periods of time. The circuit by which the motor is now energized becomes, 190—field winding — 155—85—84—82—74—87—88—156—motor brush and armature—motor field winding—191. As soon as handle 38 is turned backward, or counterclockwise, contact breaks between 74 and 87 restoring the automatic control of the motor speed to contacts 65 and 66. This handle 38 comprises common means mechanically associated both with the pair of master contacts 82—84 and with the pair of auxiliary contacts 87—74 for manually operating at least one contact of each of said pairs selectively.

Many different arrangements of electric circuits incorporating a power motor, and if desired various electrical units for introducing into such circuits fixed or variable electrical capacitance, inductance, resistance or transformer effects, will suggest themselves to those skilled in this art, wherefore the appended claims are directed to and intended to cover all variations in electrical system as well as all obvious substitutes for the herein illustrated mechanical parts and arrangements that fairly come within the language of the claims.

I claim:

1. In a motor powered electrical appliance, a circuit switching system for variously governing by unitary manual control a motor structurally incorporated in the appliance, embodying in said circuit in combination with the motor, separable motor-speed maintaining contacts, mechanism responsive to changes in speed of the motor operatively related to at least one of said speed maintaining contacts in a manner to open and close the latter repeatedly and automatically, an adjustably movable manual controller settable to different positions within its range of movement, mechanical devices operatively interposed between said manual controller and at least one of said speed maintaining contacts enabling adjustment of said manual controller to vary the extent of separation of said speed maintaining contacts and thereby predetermine the motor speed automatically maintained by said mechanism, motor cut-out contacts in series with said speed maintaining contacts arranged to be opened and closed mechanically by respectively reverse movements of said manual controller in one portion of the latter's said range of movement, and motor power sustaining contacts electrically connected in shunt to said speed maintaining contacts arranged to be opened and closed mechanically by respectively reverse movements of said manual controller in a different portion of the latter's said range of movement.

2. In a motor powered electrical appliance, a circuit switching system as defined in claim 1, in which the said manual controller is equipped with an actuating projection, there being a member operatively associated with at least one of the said cut-out contacts engageable by said projection on one occasion and another member operatively associated with at least one of the said power sustaining contacts engageable by said projection on a different occasion.

3. In a motor powered electrical appliance, a circuit switching system for variously governing by unitary manual control a motor structurally incorporated in the appliance, embodying in said circuit in combination with the motor, separable motor-speed maintaining contacts, mechanism responsive to changes in speed of the motor operatively related to at least one of said speed maintaining contacts in a manner to open and close the latter repeatedly and automatically, an adjustably movable manual controller settable to different positions within its range of movement, mechanical devices operatively interposed between said manual controller and at least one of said speed maintaining contacts enabling adjustment of said manual controller to vary the extent of separation of said speed maintaining contacts and thereby predetermine the motor speed automatically maintained by said mechanism, motor circuit cut-out contacts in series with said speed maintaining contacts arranged to be opened and closed mechanically by adjustive movements of said manual controller respectively toward and away from one end of its said range of movement, and motor power sustaining contacts electrically connected in shunt to said speed maintaining contacts arranged to be closed and opened mechanically by movements of said manual controller respectively toward and away from the other end of its said range of movement.

4. In a motor powered electrical appliance, a circuit switching system as defined in claim 3, wherein the said mechanical devices between the said manual controller and one of the said speed maintaining contacts are arranged to be actuated for varying the extent of separation of the said speed maintaining contacts by adjustive movement of said manual controller between the said ends of its said range of movement.

SHIRLEY P. MORSE.

REFERENCES CITED

The following references are of record in the file of this patent:

UNITED STATES PATENTS

| Number | Name | Date |
|---|---|---|
| 1,497,475 | Batty | June 10, 1924 |
| 2,099,050 | Chamberlain | Nov. 16, 1937 |
| 2,403,447 | Lee | July 19, 1946 |
| 2,474,850 | Lee | July 5, 1949 |